United States Patent
Watanabe et al.

(10) Patent No.: US 9,617,886 B2
(45) Date of Patent: Apr. 11, 2017

(54) EXHAUST GAS CATALYST, METHOD FOR THE PRODUCTION OF CARRIER, METHOD FOR THE PRODUCTION OF EXHAUST GAS CATALYST, AND APPARATUS FOR TREATING EXHAUST GAS

(75) Inventors: Masao Watanabe, Susono (JP); Shigeharu Takagi, Miyoshi (JP); Akira Morikawa, Nagoya (JP); Takuto Hirose, Seto (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 263 days.

(21) Appl. No.: 14/009,577

(22) PCT Filed: Mar. 23, 2012

(86) PCT No.: PCT/IB2012/000582
§ 371 (c)(1),
(2), (4) Date: Jan. 13, 2014

(87) PCT Pub. No.: WO2012/137050
PCT Pub. Date: Oct. 11, 2012

(65) Prior Publication Data
US 2014/0127084 A1    May 8, 2014

(30) Foreign Application Priority Data

Apr. 4, 2011    (JP) ................... 2011-083063

(51) Int. Cl.
*F01N 3/20* (2006.01)
*B01D 53/94* (2006.01)
(Continued)

(52) U.S. Cl.
CPC ........... *F01N 3/20* (2013.01); *B01D 53/9413* (2013.01); *B01J 21/066* (2013.01); *B01J 23/10* (2013.01);
(Continued)

(58) Field of Classification Search
None
See application file for complete search history.

(56) References Cited

U.S. PATENT DOCUMENTS 5,057,483 A * 10/1991 Wan ..................... B01D 53/945
423/213.5
6,265,342 B1    7/2001 Lim et al.
(Continued)

FOREIGN PATENT DOCUMENTS

EP    0605991 A1 * 12/2013
JP    6-108827    4/1994
(Continued)

OTHER PUBLICATIONS

EdInformatics. Solutions, Suspensions and Colloids-Summary Table. Math and Science Activity Center. 1999. http://www.edinformatics.com/math_science/solutions_suspensions_colloids.htm.*

(Continued)

*Primary Examiner* — Walter D Griffin
*Assistant Examiner* — Jelitza Perez
(74) *Attorney, Agent, or Firm* — Finnegan, Henderson, Farabow, Garrett & Dunner, LLP

(57) ABSTRACT

An exhaust gas controlling catalyst includes zirconia particles; ceria particles which contact the zirconia particles, of which a mean particle size is smaller than a mean particle size of the zirconia particles; and an active metal that is supported on at least the ceria particles in a dispersed manner.

4 Claims, 8 Drawing Sheets

(51) Int. Cl.
*B01J 21/06* (2006.01)
*B01J 23/10* (2006.01)
*B01J 23/83* (2006.01)
*B01J 35/00* (2006.01)
*B01J 35/02* (2006.01)
*B01J 37/03* (2006.01)

(52) U.S. Cl.
CPC ............ *B01J 23/83* (2013.01); *B01J 35/008* (2013.01); *B01J 35/023* (2013.01); *B01J 37/035* (2013.01); *B01D 53/944* (2013.01); *B01D 53/9477* (2013.01); *B01D 2255/2065* (2013.01); *B01D 2255/20715* (2013.01); *B01D 2255/20761* (2013.01)

(56) References Cited

U.S. PATENT DOCUMENTS

| | | |
|---|---|---|
| 2007/0197373 A1 | 8/2007 | Miura et al. |
| 2010/0111789 A1 | 5/2010 | Fajardie et al. |

FOREIGN PATENT DOCUMENTS

| | | |
|---|---|---|
| JP | 2000-271483 | 10/2000 |
| JP | 2004-74138 | 3/2004 |
| JP | 2005-313029 | 11/2005 |
| JP | 2009-131835 | 6/2009 |
| JP | 2010-501346 | 1/2010 |
| JP | 2012-159075 | 8/2012 |
| WO | WO 2012/095728 | 7/2012 |

OTHER PUBLICATIONS

Ozawa, M., "Ceria and Automotive Catalysts," Nagoya Institute of Technology, Annual Report of the Ceramics Research Laboratory, vol. 2, pp. 1-8, (2002).

Nakatani, T. et al., "Preparation of $CeO_2$-$ZrO_2$ Mixed Oxide Powders by the Coprecipitation Method for the Purification Catalysts of Automotive Emission," Journal of Sol-Gel Science and Technology, vol. 26, pp. 859-863, (2003).

* cited by examiner

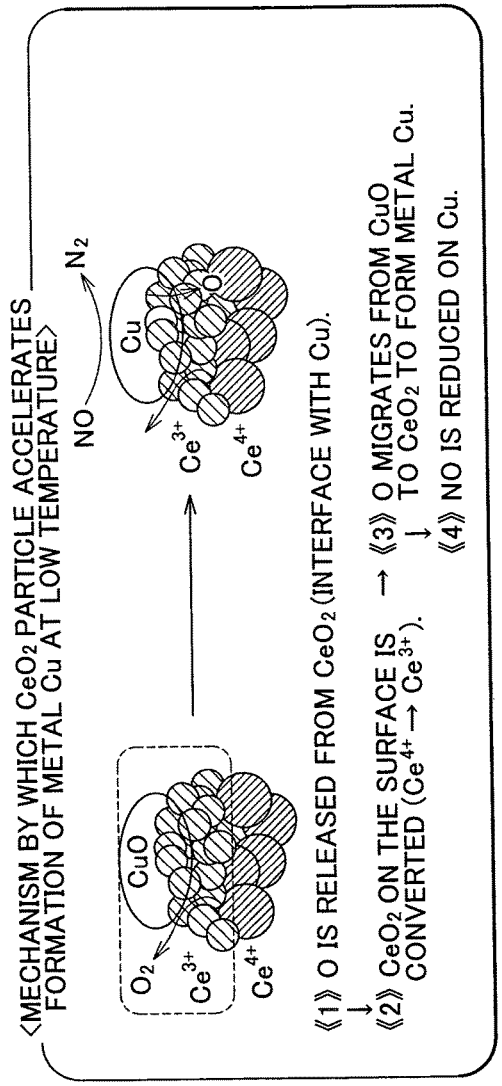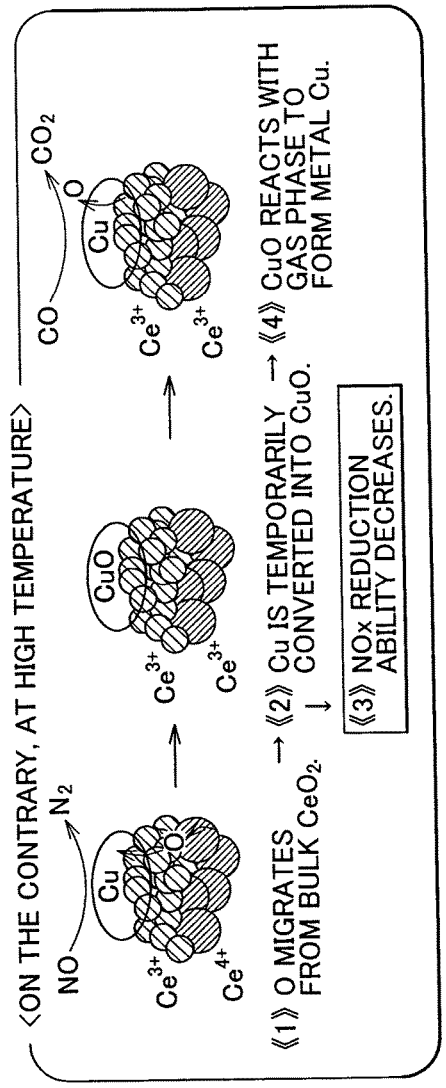
FIG. 1A
FIG. 1B (1) COMPARATIVE EXAMPLE 1

ZrO₂ PARTICLES (30nm)   CeO₂ PARTICLES (5nm)

(2) EXAMPLE

F I G . 5
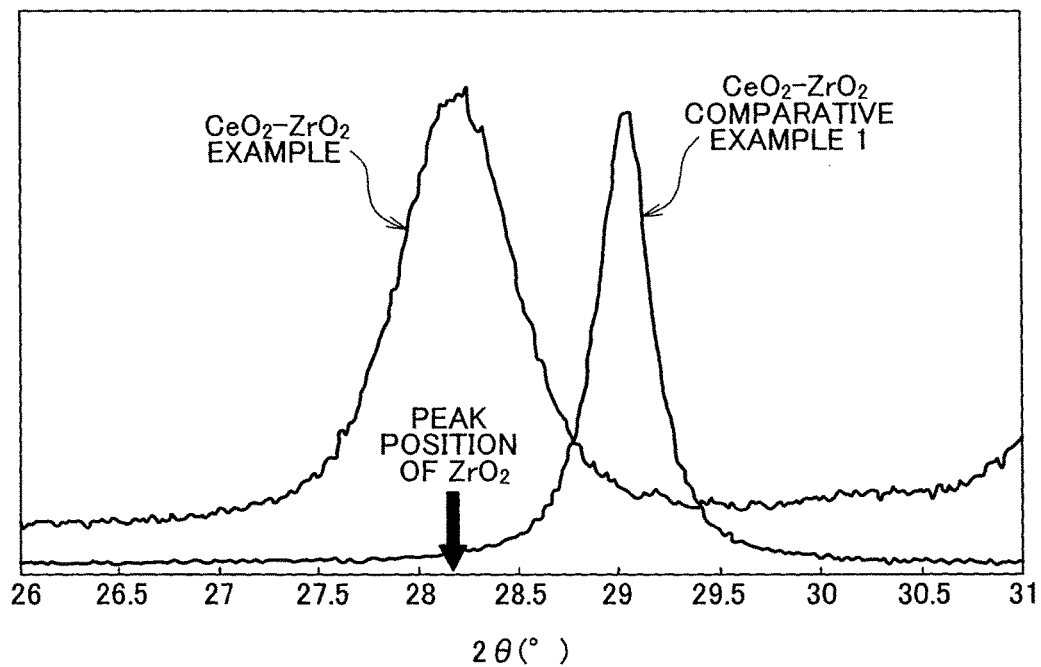

EXHAUST GAS CATALYST, METHOD FOR THE PRODUCTION OF CARRIER, METHOD FOR THE PRODUCTION OF EXHAUST GAS CATALYST, AND APPARATUS FOR TREATING EXHAUST GAS

CROSS-REFERENCE TO RELATED APPLICATIONS

This application is a national phase application of International Application No. PCT/IB2012/000582, filed Mar. 23, 2012, and claims the priority of Japanese Application No. 2011-083063, filed Apr. 4, 2011, the content of both of which is incorporated herein by reference.

BACKGROUND OF THE INVENTION

1. Field of the Invention

The present invention relates to an exhaust gas controlling catalyst that uses a base metal as an active metal, a method for the production of a carrier for the catalyst, a method for the production of the catalyst, and an exhaust gas control apparatus that uses the catalyst.

2. Description of Related Art

In the field of motorcars and so on, exhaust gas controlling catalysts that use a noble metal, such as Pt, Rh or Pd, as a catalyst metal are used. In contrast to this, exhaust gas controlling catalysts that use a base metal, instead of a noble metal (catalyst metal), as an active metal to reduce material costs are under development.

Compared to noble metals, base metals are much less active as active metals, and are inferior in ability to reduce NOx, in particular, among exhaust gas components HC/CO/NOx in stoichiometric control.

One possible solution is to reduce NOx to harmless components with the air-fuel ratio of the exhaust gas controlled to be richer than the theoretical air-fuel ratio. In this case, the combination of the base metal, such as Cu, and the carrier that supports the base metal as an active metal is critical.

Japanese Patent Application Publication No. 2009-131835 (JP-A-2009-131835) discloses a structure in which nanoparticles of Cu or the like are supported on a powdery carrier in a dispersed manner. The carrier has a powder particle size of 0.1 to 30 μm and is composed of one or more materials including zirconia and alumina. The NOx conversion efficiency decreases at high temperature (500° C. or higher) because the base metal nanoparticles are oxidized by the oxygen that is released from the inside of the carrier when, in particular, nanoparticles of a base metal, such as Cu, are supported on a ceria ($CeO_2$) carrier in a dispersed manner, whereas the NOx conversion efficiency decreases at low temperature (250° C. or lower) when a zirconia ($ZrO_2$) carrier is used.

Ozawa Masakuni: Ceria and Automotive Catalyst, Annual Report of the Ceramics Research Laboratory Nagoya Institute of Technology, vol. 2, 1-8, 2002 discloses that a decrease in conversion efficiency due to fluctuations of the air-fuel ratio can be prevented when ceria is used as a promoter in a catalyst that uses a zirconia carrier. Also disclosed is that the amount of ceria necessary to obtain peak performance is 50 mol % for at 700 K and 30 mol % for at 1300 K.

Toshio Nakatani, Hiroshi Okamoto and Rikuo Ota: Preparation of $CeO_2$—$ZrO_2$ Mixed Oxide Powder by the Coprecipitation Method for the Purification of Automotive Emission, Journal of Sol-Gel Science and Technology Volume 26, Numbers 1-3, 859-863, 2003 discloses a promising carrier for an exhaust gas controlling catalyst that has high temperature stability achieved by adding zirconia to ceria and also has high oxygen storage/release capacity (OSC). Also disclosed is that an oxidation reduction reaction produces a local effect when ceria is present in an amount of 30 to 60 mol % with respect to zirconia.

However, a catalyst that is composed of a base metal, such as Cu supported by a CZ carrier obtained by dissolving ceria in zirconia to improve the heat resistance of the ceria has a lower NOx conversion efficiency at high temperature (500° C. or higher, in particular).

SUMMARY OF THE INVENTION

The present invention provides an NOx controlling catalyst that uses a base metal as an active metal and that has high purification capacity at both low temperature (250° C. or lower) and high temperature (500° C. or higher), a method for the production of a carrier, a method for the production of a catalyst, and an exhaust gas control apparatus.

A first aspect of the present invention relates to an exhaust gas controlling catalyst that includes zirconia particles, ceria particles which contact the zirconia particles, of which a mean particle size is smaller than a mean particle size of the zirconia particles, and an active metal that is supported on at least the ceria particles in a dispersed manner.

A second aspect of the present invention relates to a method for the production of a carrier for an exhaust gas controlling catalyst. This method includes preparing a suspension that includes a cerium salt and zirconia particles, adding a precipitant solution to the suspension to allow cerium hydroxide to be supported on the surfaces of the zirconia particles; converting the cerium hydroxide that is supported on the zirconia particles into a precursor of ceria particles; and calcining the ceria precursor that is supported on the zirconia particles to obtain a powder that is composed of zirconia particles on which ceria particles are supported.

A base metal may be supported on the carrier that is produced by the above production method as an active metal.

A third aspect of the present invention relates to an exhaust gas control apparatus which includes a first-stage base metal catalyst system that oxidizes HC and CO to harmless components, of which a conversion efficiency for HC is higher than a conversion efficiency for CO, and a second-stage base metal catalyst system that has the exhaust gas controlling catalyst and reduces NOx to harmless components.

In the present invention, because both ceria and zirconia are used in the form of particles and because the ceria particles are finer than the zirconia particles, the ceria particles are supported on the zirconia particles in a highly dispersed manner. Thus, because a large amount of oxygen is not released from the inside of the carrier at high temperature in contrast to a ceria-zirconia solid solution carrier and the base metal, which is supported as an active metal, is not oxidized, a high conversion efficiency can be achieved. In addition, a conversion efficiency as high as is originally achievable with a ceria carrier can be achieved at low temperature.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 1A and 1B schematically illustrate the mechanisms by Which the conversion efficiency of a $CeO_2$—Cu catalyst is changed at low temperature and high temperature, respectively;

FIG. 5 shows XRD charts of the $CeO_2$—$ZrO_2$ solid solution carrier according to Comparative Example 1 and $CeO_2$ particle-$ZrO_2$ particle carrier according to Example of the present invention;

DETAILED DESCRIPTION OF EMBODIMENTS

The reason why the NOx conversion efficiency increases at low temperature (250° C. or lower) but decreases at high temperature (500° C. or higher) when a base metal, such as Cu, is supported as an active metal on a carrier that uses ceria ($CeO_2$) is discussed below.

FIG. 1A schematically illustrates the mechanism by which a $CeO_2$ carrier promotes formation of metal Cu at low temperature in a fuel rich atmosphere. Oxygen is released from $CeO_2$ at the interface with CuO, and $CeO_2$ at the surface is converted from $Ce^{4+}$ to $Ce^{3+}$. As a result, oxygen migrates from CuO to $CeO_2$ to form metal Cu, and the metal Cu formed reduces NO to harmless nitrogen.

FIG. 1B schematically illustrates a predicted mechanism at high temperature. Oxygen migrates from $CeO_2$ in the bulk (inside of the carrier) to the surface and oxidizes Cu to CuO, resulting in a decrease in NOx reduction ability. Then, the CuO reacts with the gas phase to form metal Cu, restoring the reduction ability. In other words, the NOx conversion efficiency decreases at high temperature because formation of metal Cu is inhibited because of the release of oxygen from the bulk (inside of the carrier).

Thus, in order to improve the purification performance of a carrier that uses $CeO_2$ at high temperature, it is necessary to prevent release of oxygen from the bulk.

Conventional $CeO_2$—$ZrO_2$ solid solution carriers have high oxygen storage release capacity (OSC) and release a large amount of oxygen at high temperature. Thus, CuO is formed and the formation of metal Cu is less likely to occur.

Thus, in Example of the present invention, the $CeO_2$ and $ZrO_2$ are not formed into a solid solution. Instead, $CeO_2$ particles, are supported on the surfaces of $ZrO_2$ particles in a finely dispersed manner. Therefore, release of oxygen from the bulk (inside of the carrier) is reduced and formation of metal Cu is accelerated at high temperature, leading to high NOx conversion efficiency. As the same time, a high NOx conversion efficiency, which originates from $CeO_2$, is achieved at low temperature.

Preferably, the ceria particles have a mean Particle size of 1 to 9 nm.

Preferably, the zirconia particles have a mean particle size of 5 to 50 nm.

Preferably, the percentage of the ceria particles to the zirconia particles is 5 to 30% by weight.

Figure 2:
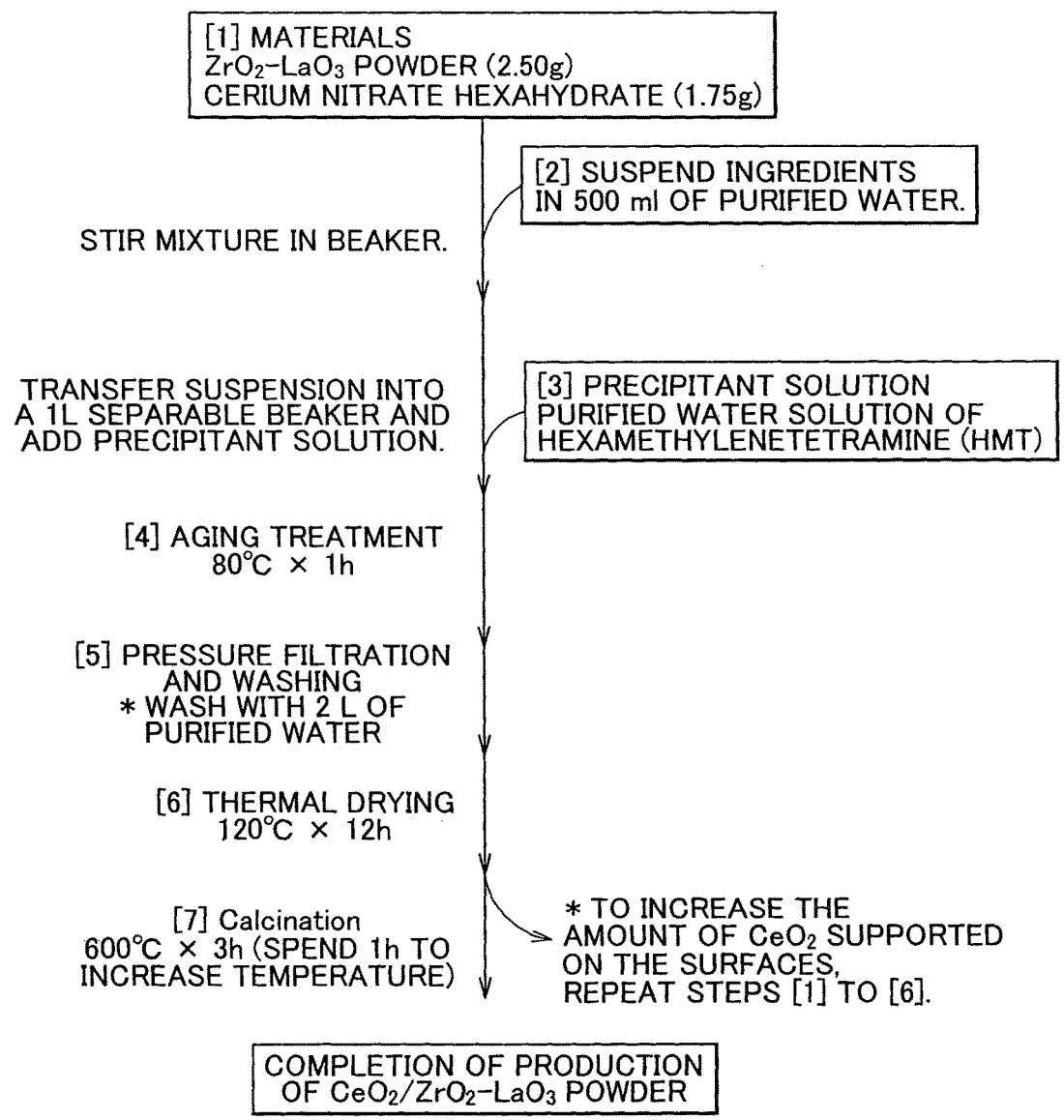
FIG. 2 illustrates an example of the process of the production of a $CeO_2$ particle-$ZrO_2$ particle carrier powder according to Example of the present invention.

According to the Example of the present invention, a $CeO_2$ particle-$ZrO_2$ particle carrier that is composed of $ZrO_2$ particles, and $CeO_2$ particles that are supported on the surfaces of the $ZrO_2$ particles in a finely dispersed manner is produced. The procedure and conditions are shown in FIG. 2.

[1] As ingredients, $ZrO_2$—$La_2O_3$ powder (2.50 g) and cerium nitrate hexahydrate (1.75 g) are prepared.

[2] The ingredients are added to 500 ml of purified water, and the mixture is stirred in a beaker to form a suspension.

[3] After the suspension is transferred into a 1 L separable beaker, a precipitant solution, a purified water solution of hexamethylenetetramine (HMT), was added to the separable beaker.

[4] The solution that is obtained in step [3] is subjected to an aging treatment at 80° C. for one hour.

[5] The solution that is obtained in step [4] is filtered under pressure and the residue is washed with 2 L of purified water.

[6] The residue that is obtained in step [5] is thermally dried at 120° C. for 12 hours to obtain a ceria precursor that is supported on zirconia particles.

Here, the amount of $CeO_2$ is expected to be approximately 5 wt %. When necessary, the steps [1] to [6] are repeated. For example, to increase the amount of $CeO_2$ to 20 wt %, the steps of [1] to [6] are repeated four times in total.

[7] The zirconia particles and the ceria precursor that is supported on the zirconia particles are calcined at 600° C. for three hours. One hour is spent to increase the temperature to 600° C.

In this way, a $CeO_2$ particle-$ZrO_2$ particle-$La_2O_3$ powder carrier is obtained.

As Comparative Examples, conventional $CeO_2$—$ZrO_2$ solid solution carrier (Comparative Example 1) and $ZrO_2$ carrier (Comparative Example 2) were produced by conventionally known methods.

Cu was deposited on each powder carrier in an amount of 5 wt % to prepare a catalyst.

Figure 3:
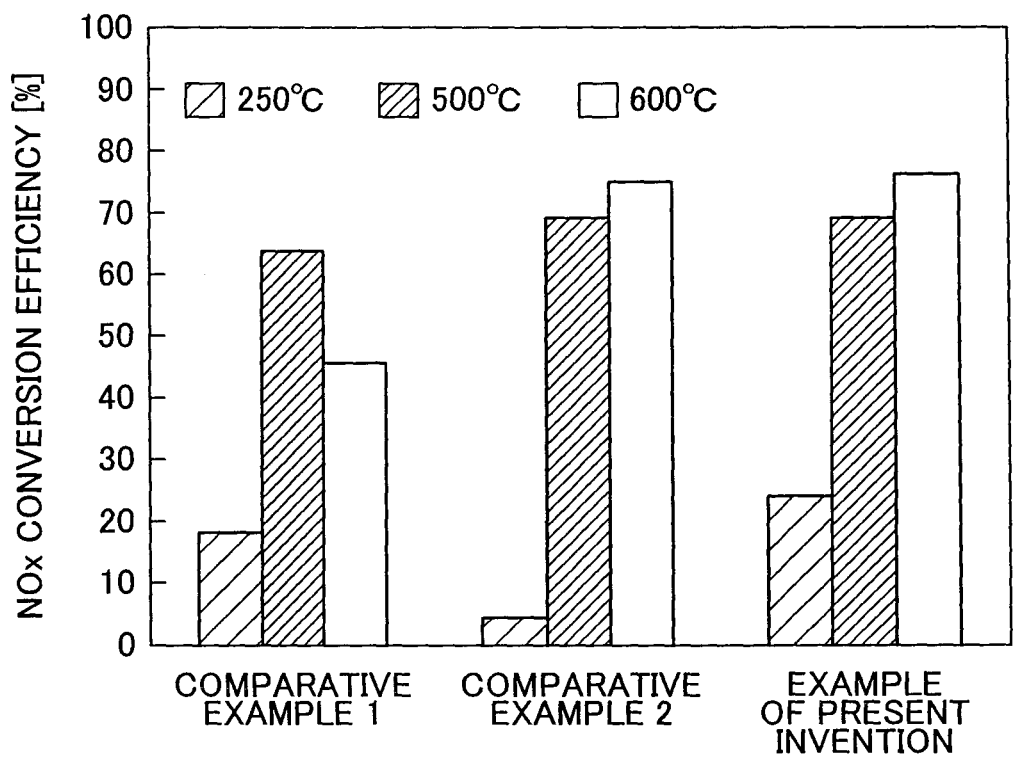
FIG. 3 shows the NOx conversion efficiency of the catalyst that is composed of a $CeO_2$ particle-$ZrO_2$ particle carrier with Cu supported thereon according to Example of the present invention in comparison with that which was observed when a $CeO_2$—$ZrO_2$ solid solution carrier according to Comparative Example 1 or a $ZrO_2$ carrier according to Comparative Example 2 was used.

Using a model gas that had the following composition, the NOx conversion efficiency was measured at 250° C., 500° C. and 600° C. under the following conditions. The results are shown in FIG. 3.

<Model gas composition> NO=0.3%, CO=0.9%, $O_2$=0.3%, $H_2O$=3%, balance=$N_2$, gas flow rate=10 L/min, catalyst pellet=3 g When the $CeO_2$—$ZrO_2$ solid solution carrier of Comparative Example 1 was used, the catalyst exhibited a high purification capacity from low temperature (250° C.), and showed a significant increase in the conversion efficiency at 500° C. However, the catalyst showed a decrease in the conversion efficiency at a high temperature of 600° C.

When the $ZrO_2$ carrier of Comparative Example 2 was used, the catalyst showed a low conversion efficiency at a low temperature (250° C.) but showed a high conversion efficiency at high temperatures of 500° C. to 600° C.

When the $CeO_2$ particle-$ZrO_2$ particle carrier of Example of the present invention was used, the catalyst exhibited a high purification capacity from a low temperature (250° C.), and showed a high conversion efficiency even at high temperatures of 500° C. to 600° C.

As described above, according to Example, a high NOx conversion efficiency can be achieved at both low temperature (250° C.) and high temperature (600° C.).

In particular, the improvement in conversion efficiency at high temperature in Example, in spite of the fact that the carriers of Comparative Example 1 and Example are the same in that $CeO_2$ and $ZrO_2$ are combined, is believed to be due to the difference in particle structure between Comparative Example 1 and Example.

Figure 4A:
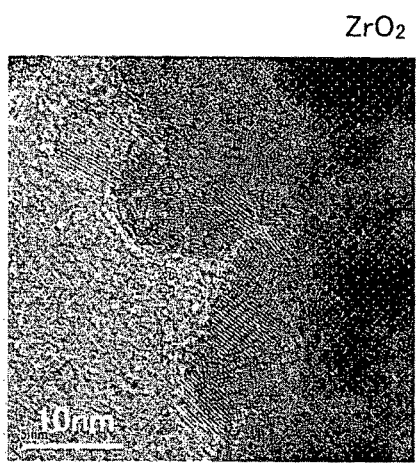
FIGS. 4A and 4B show TEM images of the $CeO_2$—$ZrO_2$ solid solution carrier according to Comparative Example 1 and $CeO_2$ particle-$ZrO_2$ particle carrier according to Example of the present invention, respectively.
Figure 4B:
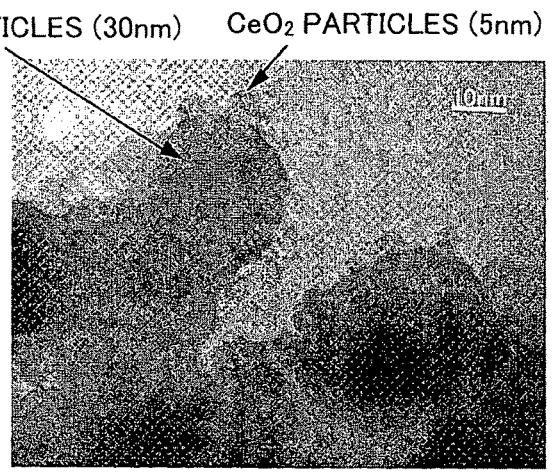

FIGS. 4A and 4B show TEM images that show the particle structure of the carriers of Comparative Example 1 and Example, respectively.

The carrier of Comparative Example 1, which is shown in FIG. 4A, has a conventional structure in which $CeO_2$ and $ZrO_2$ form a solid solution. The TEM image shows that only one type of particles is present.

The carrier of Example, which is shown in FIG. 4B, has a structure in which $CeO_2$ particles with a mean particle size of 5 nm are supported, in a dispersed manner, on the surfaces of $ZrO_2$ particles with a mean particle size of 30 nm.

FIG. 5 compares the XRD charts of the carriers of Example and Comparative Example 1. The peak position in Comparative Example 1 is shifted from that of $ZrO_2$ because of a change in crystal structure due to the formation of solid solution with $CeO_2$.

On the contrary, in Example of the present invention, the peak position is consistent with the original peak position of $ZrO_2$, which means that $ZrO_2$ and $CeO_2$ are present without forming a solid solution. The fact that $ZrO_2$ is present in an undissolved form indicates that its counterpart $CeO_2$ is not dissolved either. The reason why the peak of $CeO_2$ cannot be distinguished is that the amount of $CeO_2$ particles is so small (20% of the amount of $ZrO_2$ particles) and the mean particle size of $CeO_2$ particles is so small in this example that a clear peak does not appear. However, a small peak of $CeO_2$ is present around the peak of $ZrO_2$ and slightly broadens the peak of $ZrO_2$.

As described above, it is believed that, in Example of the present invention, because $CeO_2$ particles are supported on the surfaces of $ZrO_2$ particles in a highly dispersed manner, release of oxygen from inside of the carrier at high temperature is prevented and formation of metal Cu as an active metal is accelerated, leading to a high NOx conversion efficiency.

Figures 6A, 6B, 6C:
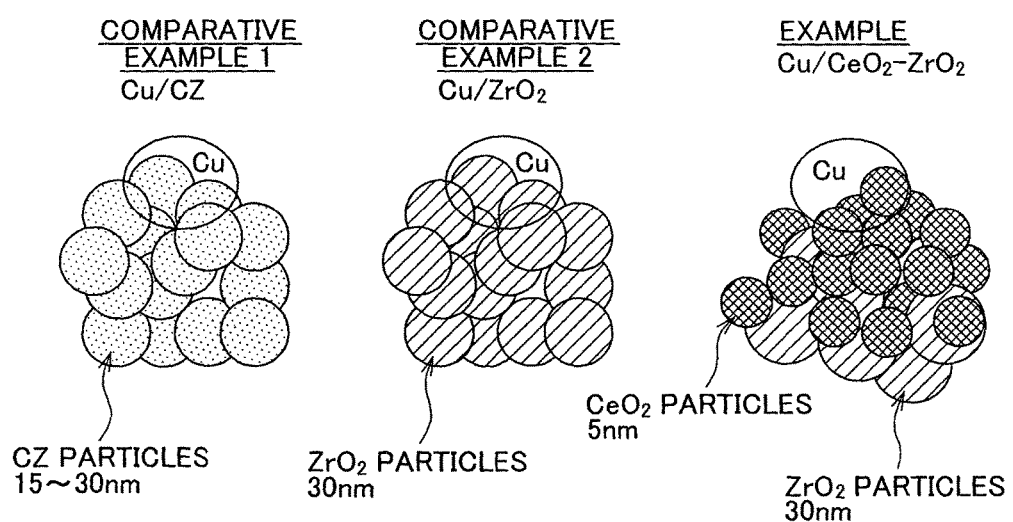
FIGS. 6A, 6B and 6C show the catalyst particle structures of a catalyst that is composed of the $CeO_2$—$ZrO_2$ solid solution carrier (Comparative Example 1) with Cu supported thereon, a catalyst that is composed of the $ZrO_2$ carrier (Comparative Example 2) with Cu supported thereon, and the $CeO_2$ particle-$ZrO_2$ particle carrier with Cu supported thereon according to the Example of the present invention.

FIGS. 6A, 6B and 6C schematically illustrate the particle structures of Comparative Example 1, Comparative Example 2, and Example of the present invention, respectively. The carrier of Comparative Example 1, which is shown in FIG. 6A, composed of particles of a solid solution of $CeO_2$ and $ZrO_2$ (CZ particles: 15 to 30 nm), and the carrier of Comparative Example 2, which is shown in FIG. 6B, is composed of $ZrO_2$ particles (30 nm). In comparison, the carrier of Example of the present invention, which is shown in FIG. 6C, composed of $ZrO_2$ particles (30 nm) and $CeO_2$ particles (5 nm).

Typically, the $ZrO_2$ particles have a primary particle size of 5 to 30 nm (approximately 30 nm in average), and the $CeO_2$ particles have a primary particle size of 1 to 9 nm (approximately 5 nm in average). The $CeO_2$ particles do not have a shell structure that continuously covers the surfaces of the $ZrO_2$ particles but are supported on surfaces of $ZrO_2$ in a discretely dispersed (highly dispersed) manner. To obtain $CeO_2$ particles that are supported in such a highly dispersed manner, the amount of $CeO_2$ is at least 5% by weight but no more than 30% by weight, with respect to the amount of $ZrO_2$. The amount of $CeO_2$ is preferably approximately 20% by weight, with respect to the amount of $ZrO_2$.

Figure 7:
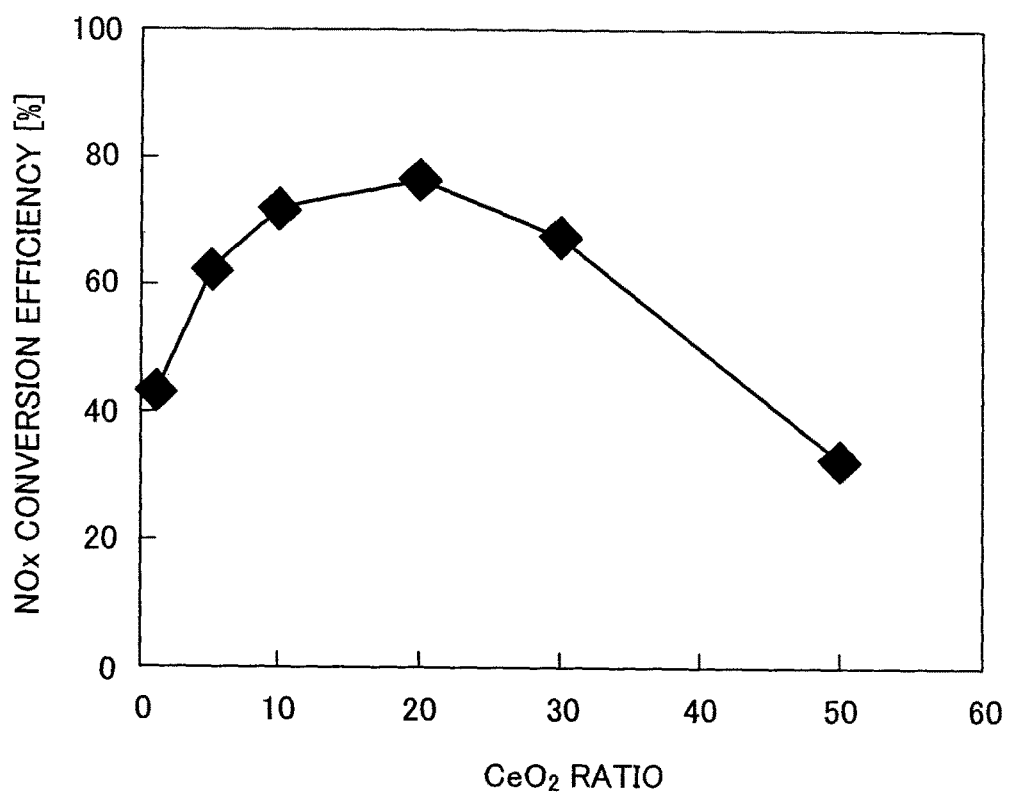
FIG. 7 shows the change in NOx conversion efficiency depending on the ratio of the amount of $CeO_2$ to the amount of $ZrO_2$.

FIG. 7 shows the change in NOx conversion efficiency depending on the ratio of the amount of $CeO_2$ to the amount of $ZrO_2$. A high NOx conversion efficiency is achieved when the weight ratio of $CeO_2$ is in the range of 5 to 30%, and the NOx conversion efficiency has a peak when the weight ratio of $CeO_2$ is 20%.

Figure 8:
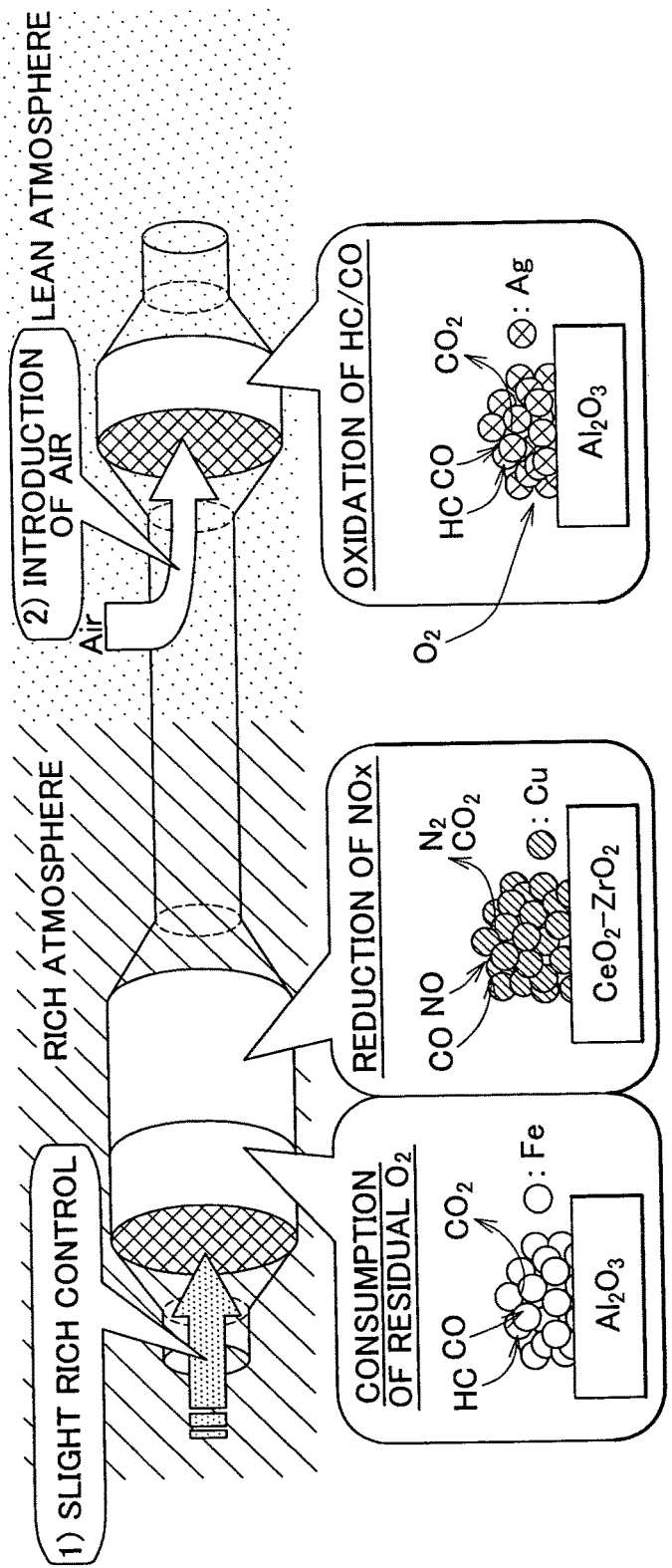
FIG. 8 illustrates a function-separated controlling system to which a NOx controlling catalyst according to Example of the present invention is applied.

FIG. 8 illustrates a typical example of an exhaust gas control apparatus (function-separated controlling system) to which the NOx controlling catalyst that uses the $CeO_2$ particle-$ZrO_2$ particle carrier of the Example of the present invention is applied.

The apparatus that is shown in FIG. 8 includes a first-stage base metal catalyst system with a honeycomb structure: $Fe/Al_2O_3$ catalyst (=active metal/carrier, the same applies in the following), a second-stage base metal catalyst system with a honeycomb structure: $Cu/(CeO_2—ZrO_2)$ catalyst (the $CeO_2$ particle-$ZrO_2$ particle carrier of the present invention is used), and an additional third-stage base metal catalyst system with a honeycomb structure that is located on the downstream of the second-stage base metal catalyst system: $Ag/Al_2O_3$ catalyst. The first-stage base metal catalyst system to the third-stage base metal catalyst system are arranged in series in this order as shown from left to right in FIG. 8.

The exhaust gas from the engine is controlled to be slightly richer (A/F=approximately 14) than the stoichiometric ratio (A/F=14.6).

Under these conditions, HC and CO are oxidized to harmless components by $O_2$ that remains in the exhaust gas in the first-stage $Fe/Al_2O_3$ catalyst system. At this time, the conversion efficiency for CO is higher than that for HC. CO that remains unoxidized or is produced here is reduced to harmless components when NOx is reduced to harmless components through the following CO—NO reaction in the second-stage $Cu/(CeO_2—ZrO_2)$ catalyst system.

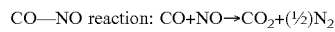

CO—NO reaction: $CO+NO \rightarrow CO_2+(½)N_2$

HC and CO that remains here is oxidized to harmless components in the third-stage $Ag/Al_2O_3$ catalyst system, which is additionally provided on the downstream side. To accelerate the oxidation, air is introduced as needed through an air introduction device that is provided between the second-stage catalyst system and the third-stage catalyst system.

When the $CeO_2$ particle-$ZrO_2$ particle carrier according to Example of the present invention is used in an exhaust gas control apparatus that has the above structure, the temperature range of exhaust gas in which required performance is achieved can be increased.

According to the present invention, there are provided an NOx controlling catalyst that uses a base metal as an active metal and that has purification capacity at both low temperature (250° C. or lower) and high temperature (500° C.

or higher), a method for the production of a carrier, a method for the production of a catalyst, and an exhaust gas control apparatus.

What is claimed is:

1. An exhaust gas controlling catalyst, comprising:
   zirconia particles;
   ceria particles which contact the zirconia particles, of which a mean particle size is smaller than a mean particle size of the zirconia particles; and
   an active metal that is supported on at least the ceria particles in a dispersed manner,
   wherein the active metal is Cu,
   wherein a mean particle size of the ceria particles is 1 to 9 nm,
   wherein a percentage of the ceria particles to the zirconia particles is 5 to 30% by weight, and
   a mean particle size of the zirconia particles is 5 to 30 nm.

2. An exhaust gas control apparatus, comprising:
   a first-stage base metal catalyst system that oxidizes HC and CO to harmless components, of which a conversion efficiency for HC is higher than a conversion efficiency for CO; and
   a second-stage base metal catalyst system that has the exhaust gas controlling catalyst according to claim 1 and reduces NOx to harmless components.

3. The exhaust gas controlling catalyst according to claim 1, wherein the ceria particles are supported on the surface of the zirconia particles in a dispersed manner.

4. An exhaust gas control apparatus according to claim 2, wherein the first-stage base metal catalyst system is a $Fe/Al_2O_3$ catalyst.

* * * * *